(12) United States Patent
Yamada

(10) Patent No.: US 9,069,511 B2
(45) Date of Patent: Jun. 30, 2015

(54) PRINT CONTROL DEVICE AND COMPUTER-READABLE STORAGE MEDIUM STORING A PROGRAM

(71) Applicant: Jun Yamada, Tajimi (JP)

(72) Inventor: Jun Yamada, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/627,125

(22) Filed: Sep. 26, 2012

(65) Prior Publication Data

US 2013/0169976 A1    Jul. 4, 2013

(30) Foreign Application Priority Data

Dec. 28, 2011    (JP) .................................. 2011-287799

(51) Int. Cl.
G06F 3/12      (2006.01)
G06K 15/02     (2006.01)

(52) U.S. Cl.
CPC ............ *G06F 3/1292* (2013.01); *G06F 3/1204* (2013.01); *G06F 3/1206* (2013.01); *G06F 3/1247* (2013.01); *G06F 3/1248* (2013.01); *G06F 3/1254* (2013.01)

(58) Field of Classification Search
None
See application file for complete search history.

(56) References Cited

U.S. PATENT DOCUMENTS

| 6,309,305 | B1* | 10/2001 | Kraft .............................. 455/566 |
| 6,553,240 | B1* | 4/2003 | Dervarics ....................... 455/566 |
| 7,685,514 | B1 | 3/2010 | Khatwani et al. |
| 8,184,324 | B2* | 5/2012 | Chang et al. .................. 358/1.15 |
| 8,527,892 | B2* | 9/2013 | Sirpal et al. .................... 715/769 |
| 8,630,000 | B2* | 1/2014 | Chang et al. .................. 358/1.15 |
| 8,873,088 | B2 | 10/2014 | Kotake |
| 2002/0044299 | A1* | 4/2002 | Iwase et al. .................... 358/1.15 |
| 2002/0097433 | A1* | 7/2002 | Chang et al. .................. 358/1.15 |
| 2005/0078995 | A1* | 4/2005 | Bever et al. ...................... 400/62 |
| 2010/0039660 | A1* | 2/2010 | Chang et al. .................. 358/1.14 |
| 2010/0227550 | A1* | 9/2010 | Chang et al. ..................... 455/39 |
| 2010/0245892 | A1* | 9/2010 | Takahashi .................... 358/1.15 |
| 2011/0292440 | A1 | 12/2011 | Kotake |
| 2012/0084694 | A1* | 4/2012 | Sirpal et al. .................... 715/769 |
| 2012/0110486 | A1* | 5/2012 | Sirpal et al. .................... 715/770 |
| 2012/0311438 | A1* | 12/2012 | Cranfill et al. ................. 715/256 |

FOREIGN PATENT DOCUMENTS

| CN | 102262514 A | 11/2011 |
| JP | 6161689 | 6/1994 |
| JP | 2002041263 | 2/2002 |
| JP | 2002063013 | 2/2002 |
| JP | 2008087335 | 4/2008 |
| WO | 2010/094965 A1 | 8/2010 |

OTHER PUBLICATIONS

Extended European Search Report for corresponding European Application No. 12185591.0 dated Feb. 3, 2014.

(Continued)

*Primary Examiner* — Marcus T Riley

(74) *Attorney, Agent, or Firm* — Banner & Witcoff, Ltd.

(57) ABSTRACT

A print control device may include a control device configured to identify a data type of print target data obtained from a clipboard, generate print data based on the print target data in accordance with a print setting appropriate for the identified data type, and send the generated print data to a printing apparatus.

24 Claims, 14 Drawing Sheets

(56) References Cited

OTHER PUBLICATIONS

Screen shots, including a statement of relevance, of version 1.00.86 of the "Samsung Mobile Print" application provided by Samsung Electronics Co. Ltd. prior to the priority date of the present application.

Description of version 2.00.37, updated Jun. 14, 2014, of "Samsung Mobile Print" application; available at http://itunes.apple.com/us/app/samsung-mobile-print/id429611283?mt=8 (last visited Aug. 19, 2014).

Apr. 21, 2015—(CN) Notification of First Office Action—App 201210549480.8, Eng Tran.

* cited by examiner

PRINT CONTROL DEVICE AND COMPUTER-READABLE STORAGE MEDIUM STORING A PROGRAM

CROSS-REFERENCE TO RELATED APPLICATION

This application claims priority from Japanese Patent Application No. 2011-287799, filed on Dec. 28, 2011, which is incorporated herein by reference.

FIELD OF DISCLOSURE

The disclosure relates to a print control device that sends print data to a printing apparatus and a computer-readable storage medium storing a program, and more specifically, to a print control device including a clipboard and a technique for printing data stored in the clipboard.

BACKGROUND

In a known technique, for example, a clipboard provided by an operating system ("OS") of an information processing device is used to store a document or an image that is displayed on the information processing device.

In a printing technique using the clipboard, for example, a part desired to be printed is copied from contents displayed on a web browser (that is, data is stored in the clipboard) and the copied part is pasted into an application having a printing function, for example, a word processor, (that is, the stored data is read from the clipboard). Then, the pasted part is printed through the application.

SUMMARY

In the above mentioned printing technique, a user may need to paste the data from the clipboard into the application, for example, the word processor, to print the data stored in the clipboard. This paste operation may be burdensome for the user who desires to print the data stored in the clipboard. Depending on the contents of the data, the above mentioned printing technique using the paste operation may not provide a printed matter having adequate quality based on the data stored in the clipboard.

Embodiments of the disclosure may provide a print control device and a computer-readable storage medium storing a program that reduce a user's burden and/or achieve printing appropriate for a type of data stored in a clipboard.

One or more aspects of the disclosure relate to a print control device which may include a control device configured to identify a data type of print target data obtained from a clipboard, generate print data based on the print target data obtained from the clipboard in accordance with a print setting appropriate for the identified data type, and send the generated print data to a printing apparatus.

The print control device according to one or more aspects of the disclosure may identify the data type of the print target data obtained from the clipboard. The data type may be classified, for example, as "image" or "text," which may be determined based on the contents of the data, or as "markup language," which may be determined based on file variations. The print control device may generate the print data based on the print target data obtained from the clipboard in accordance with the print setting appropriate for the data type. When the data type is "text," for example, monochrome printing with lower print quality may be specified for the print setting. When the data type is "image," color printing with higher print quality may be specified for the print setting.

The print control device may generate the print data directly from the print target data obtained from the clipboard. Therefore, a user may not need to paste the print target data to an application from the clipboard. This configuration may require the user to perform fewer operations to print the print target data. The print setting may be specified in accordance with the data type of the print target data. Therefore, the print control device may customize printing based on characteristics of the print target data.

DESCRIPTION OF THE DRAWINGS

For a more complete understanding of the present disclosure, needs satisfied thereby, and the objects, features, and advantages thereof, reference now is made to the following descriptions taken in connection with the accompanying drawing.

DETAILED DESCRIPTION OF EMBODIMENTS

Hereinafter, embodiments of a print control device according to one or more aspects of the disclosure are described with reference to the accompanying drawings. In view of the embodiments, one or more aspects of the disclosure may be adopted to a print application program installed or otherwise interpreted on a mobile device.

Figure 1:
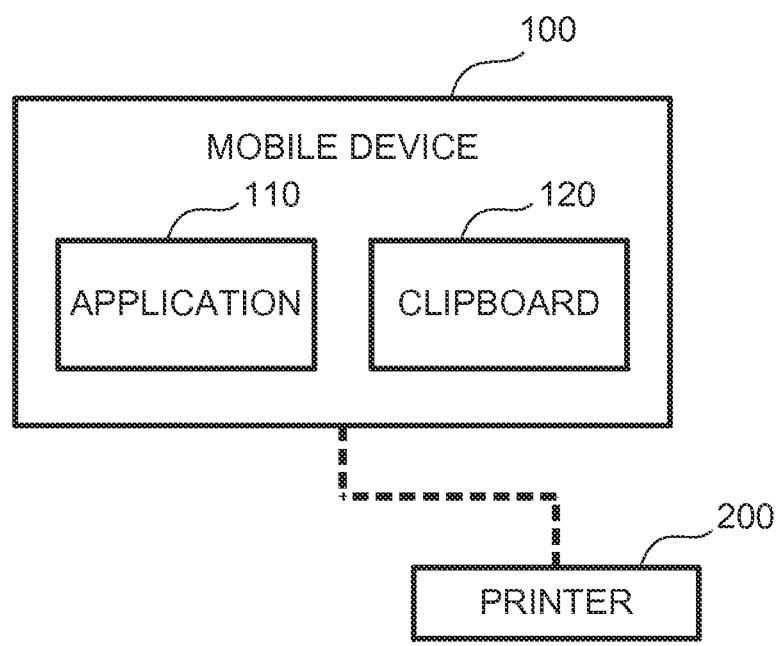
FIG. 1 is a block diagram depicting an example configuration of a printing system according to one or more aspects of the disclosure.

As depicted in FIG. 1, a printing system according to an example embodiment may comprise a mobile device 100 (an example of a print control device) and a printer 200 (an example of a printing apparatus). Mobile device 100 may be configured to output print data to a specified printer, such as printer 200. Printer 200 may be configured to perform a printing function. In this printing system, data communication may be available between mobile device 100 and printer 200. Mobile device 100 may be, for example, a smartphone or mobile information terminal device (for example, a personal digital assistant (PDA)). Wired communication or wireless communication may be available between mobile device 100 and printer 200.

Mobile device 100 may store and/or interpret an application 110 configured to issue an instruction to print data stored in mobile device 100. Herein, the application 110 may refer to a collection of computer-executable instructions stored in memory. Mobile device 100 may be configured to receive a print instruction from a user via application 110. Application 110 may be configured to generate print data based on print target data and send the generated print data to printer 200 in response to the print instruction. The generation of the print data may be implemented by a printer driver that may be built into application 110. Alternatively, in other embodiments, for example, mobile device 100 may be configured to be installed with the printer driver separately from application 110. In this case, mobile device 100 may be configured to request the printer driver to generate print data.

Mobile device 100 may comprise a storage area (hereinafter, referred to as a "clipboard 120") that may be commonly used by a plurality of applications, including application 110, and may temporarily store data. Clipboard 120 may be configured to store one or more pieces of data. In some embodiments, the clipboard 120 may be configured to store a single piece of data such that when new data is added into the clipboard 120, the new data overwrites any data previously existing in the clipboard 120. The clipboard 120 may be made available in mobile device 100 as a function of an operating system ("OS") installed on mobile device 100. For example, the OS of the mobile device 100 may allocate and/or control memory within the mobile device 100 to be used as the clipboard 120 so that the clipboard 120 may be a temporary, common storage area accessible by a plurality of applications.

Printer 200 may be configured to receive print data from mobile device 100 and/or another print control device and print the print data onto a sheet. Printer 200 may be configured to perform a printing function and may be either a multi-color printer or a monochrome printer. An image forming system of printer 200 may be an electrophotographic system, an inkjet system, etc. For example, the printer 200 shown in FIG. 1 may be an electrophotographic color printer.

Any number of printers 200 or mobile devices 100 may be present and connected with each other in the printing system. The printing system may further comprise information processing devices (for example, scanners or facsimile machines). One or more servers may be connected to the printing system to send a print job from mobile device 100 to printer 200 via the one or more servers. Additionally or alternatively, other communication devices (e.g., routers, switches, etc.) may exist between the mobile device 100 and the printer 200.

Figure 2:
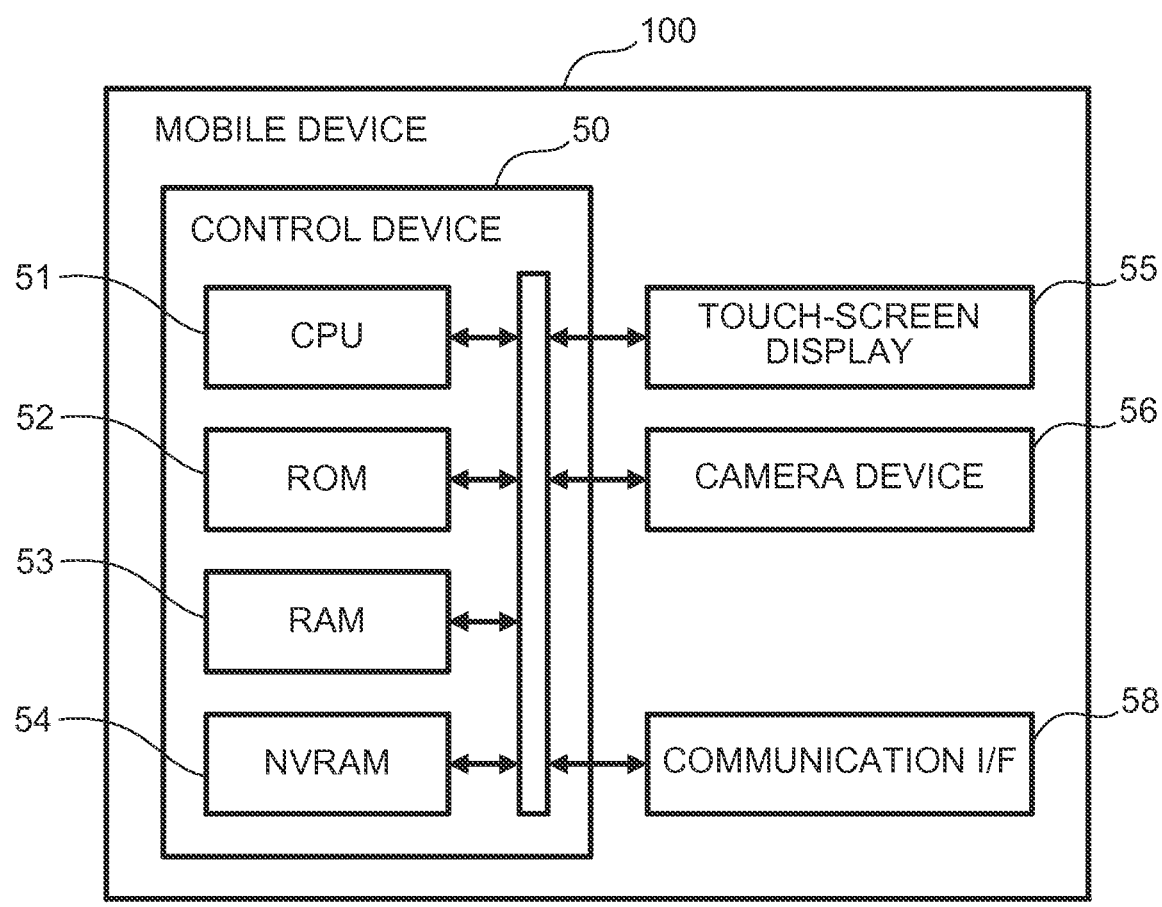
FIG. 2 is a block diagram depicting an example configuration of a mobile device included in the printing system according to one or more aspects of the disclosure.

An example configuration of mobile device 100 is described below. As depicted in FIG. 2, mobile device 100 may comprise a control device 50 that may comprise a central processing unit ("CPU") 51, a read-only memory ("ROM") 52, a random-access memory ("RAM") 53, and a nonvolatile RAM ("NVRAM") 54. Mobile device 100 may further comprise a touch-screen display 55, a camera device 56, and a communication interface ("I/F") 58. Touch-screen display 55 may perform an input function as well as a display function. Communication interface 58 may allow mobile device 100 to communicate with printer 200. In some embodiments, the communication interface 58 may be configured to connect the mobile device to one or more networks, such as a cellular backhaul or the Internet. Control device 50 may control touch-screen display 55, camera device 56, and communication interface 58.

NVRAM 54 of mobile device 100 may store an OS, browsers for browsing files on the Internet, and device drivers for controlling various devices. NVRAM 54 may also store application 110. The OS may allocate storage area from RAM 53 for the clipboard 120.

CPU 51 may store processing results in RAM 53 or NVRAM 54 in response to executing various programs read from ROM 52 and/or programs read from NVRAM 54. CPU 51 may also perform the functions of application 110. For example, CPU 51 may execute the computer-executable instructions included in the application 110.

Figure 3:
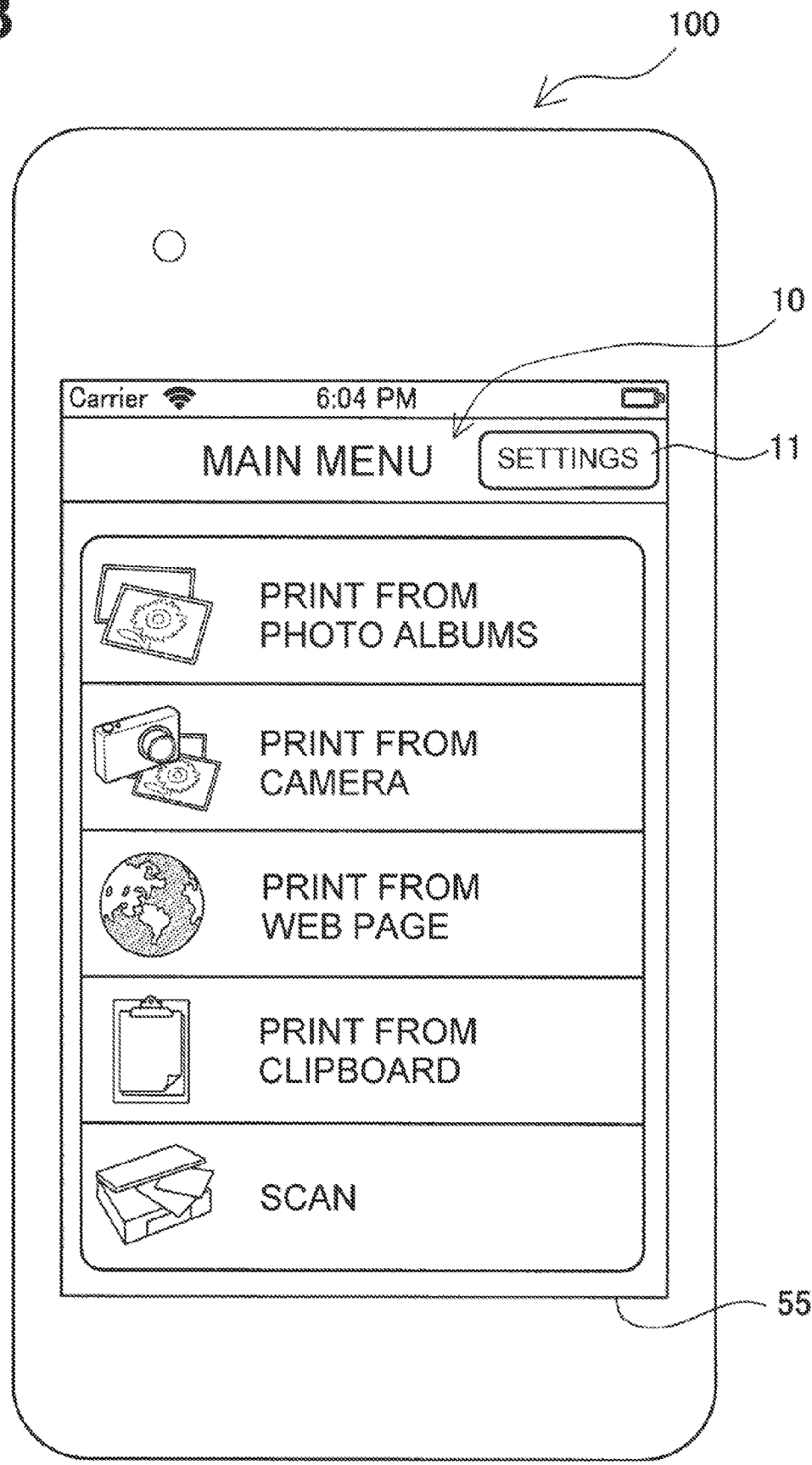
FIG. 3 depicts an illustrative application screen according to one or more aspects of the disclosure.

Next, application 110 is described below. Upon receipt of a startup instruction of application 110 from the user, mobile device 100 may start application 110. FIG. 3 depicts a main menu screen 10 of application 110 displayed on touch-screen display 55 in response to initiating the application 110.

Main menu screen 10 may display a list of functions that application 110 may be configured to perform. As shown in the embodiment of FIG. 3, application 110 may perform one or more functions, such as a photo album printing function, a camera photo printing function, a webpage printing function, a clipboard data printing function, and a scanning function. The photo album printing function may print image data stored in the NVRAM 54 of mobile device 100. The camera photo printing function may print image data of a picture taken by camera device 56 in response to the picture taking. For example, when the camera device 56 is triggered to capture a picture, the camera photo printing function may immediately cause the picture to be printed. The webpage printing function may be used for printing a web page. The clipboard data printing function may be used for printing data stored in clipboard 120. The scanning function may be used for sending a scanning instruction to a scanner and receiving data of an image scanned by the scanner.

Application 110 may receive a user selection of one of the functions while main menu screen 10 appears. The function selection may be implemented by, for example, a user touching an area displaying a function name of a desired function on the touch-screen display 55 of the mobile device 100.

When application 110 accepts the selection of one of the functions, application 110 may change the current screen to a setting screen of the selected function. Appropriate setting screens are provided for individual functions. When application 110 detects an input of a print instruction on the setting screen, application 110 may generate print data that may be print target data translated into a page-description language ("PDL"). Then, application 110 may send a print job including the print data to printer 200. When application 110 detects an input of a scanning instruction on the setting screen, application 110 may send a scanning instruction to a scanner.

Main menu screen 10 may comprise a virtual "SETTINGS" button 11 for moving to a function-details setting screen for specifying detailed settings of each function of application 110. For example, the detailed settings of the clipboard data printing function may permit a user to choose whether data is erased from clipboard 120 after printing and/or may display a screen for explaining how to store data in clipboard 120 (hereinafter, referred to as an "operation procedure screen") when data is not stored in clipboard 120. The detailed settings may be used in a clipboard data printing process described later.

The clipboard data printing process of application 110 is described with reference to a flowchart of FIG. 4. The clipboard data printing process may implement the clipboard data printing function. The clipboard data printing process may be performed by CPU 51 of mobile device 100 when the CPU 51 detects a user's selection of the clipboard data printing function on main menu screen 10. Herein, where the CPU 51 is described as performing a function it should be understood that the CPU 51 may process computer-executable instructions for performing said function.

In the clipboard data printing process, first, CPU 51 may determine whether the clipboard 120 stores data (step S101). When clipboard 120 stores data (step S101:YES), the application 110 may obtain the data from the clipboard 120. For example, CPU 51 may read the data from clipboard 120, and may write the data, which may be referred to as print target data (e.g., data intended and/or desired to be printed), to a storage area of application 110 (step S102).

After step S102, CPU 51 may identify a type of the print target data (step S103). In step S103, the print target data may be classified under, for example, four data types, such as "image," "text," "markup language," or "unknown." CPU 51 may identify the data type of the target print data based on, for example, a data format, a filename extension, a header of the print target data, or a response from clipboard 120. The header may include type information of the print target data. The response from clipboard 120 (or the OS) may include the data type of the print target data.

More specifically, in step S103, CPU 51 may identify the data type of the print target data as an "image" when the print target data is a file in JPEG format (JPEG file) or in bitmap format (bitmap file). CPU 51 may identify the data type of the print target data as "text" when the print target data is a file in text/plain format (plain text file). CPU 51 may identify the data type of the print target data as "markup language" when the print target data is a file in web archive format or in text/html format (e.g., Hypertext Markup Language (HTML) or Extensible Markup Language (XML) file). For example, CPU 51 may identify print target data as "markup language" by detecting tags (e.g., HTML tags) within the print target data. CPU 51 may identify the data type of the print target data as "unknown" when the print target data is not applicable to any of the "image," "text," or "markup language," data types (for example, where the print target data is a video file).

After step S103, CPU 51 may determine whether the type identification result of step S103 is "unknown" (step S104). When the data type is "unknown" (step S104:YES), CPU 51 might not print contents of the clipboard 120 (e.g., might not designate content of the clipboard 120 as print target data). In some cases, CPU 51 may determine that clipboard 120 does not store any data, and the routine may proceed to step S121. Details of step S121 and subsequent steps will be described later.

When the data type is other type than "unknown," that is, the data type is one of "image," "text," and "markup language" (step S104:NO), CPU 51 may perform a print data generating process for generating print data corresponding to the identified type (step S105).

Figure 5:
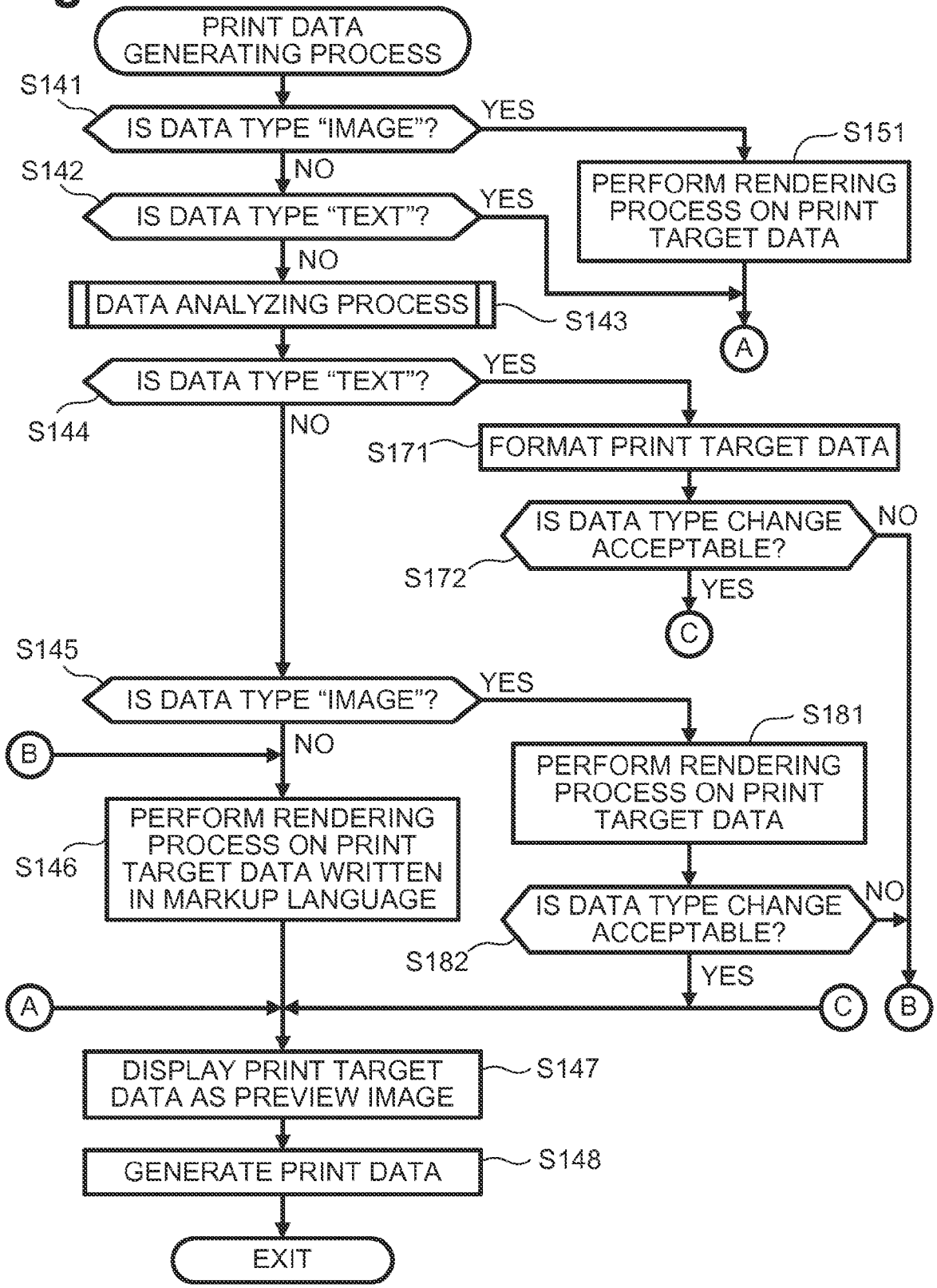
FIG. 5 is a flowchart depicting an example print data generating process according to one or more aspects of the disclosure.

FIG. 5 is a flowchart depicting an example print data generating process of step S105. In the print data generating process of FIG. 5, first, CPU 51 may determine whether the data type of print target data obtained from the clipboard 120 is an "image" (step S141). When the data type is an "image" (step S141:YES), CPU 51 may perform a rendering process on the print target data read in step S102 (step S151). Additionally, in step S151, CPU 51 may perform a correction process on the image data. The correction process may comprise, for example, an edge emphasizing process, a shading correction process, and a color correction process. After step S151, the routine may proceed to step S147.

When the data type is not an "image" (step S141:NO), CPU 51 may determine whether the data type is "text" (step S142). When the data type is "text" (step S142:YES), the routine may proceed to step S147.

When the data type is not "text" (step S142:NO), CPU 51 may determine that the data type is "markup language." As a result, CPU 51 may perform a data analyzing process for further analyzing the contents of the print target data written in markup language (step S143).

Figure 6:
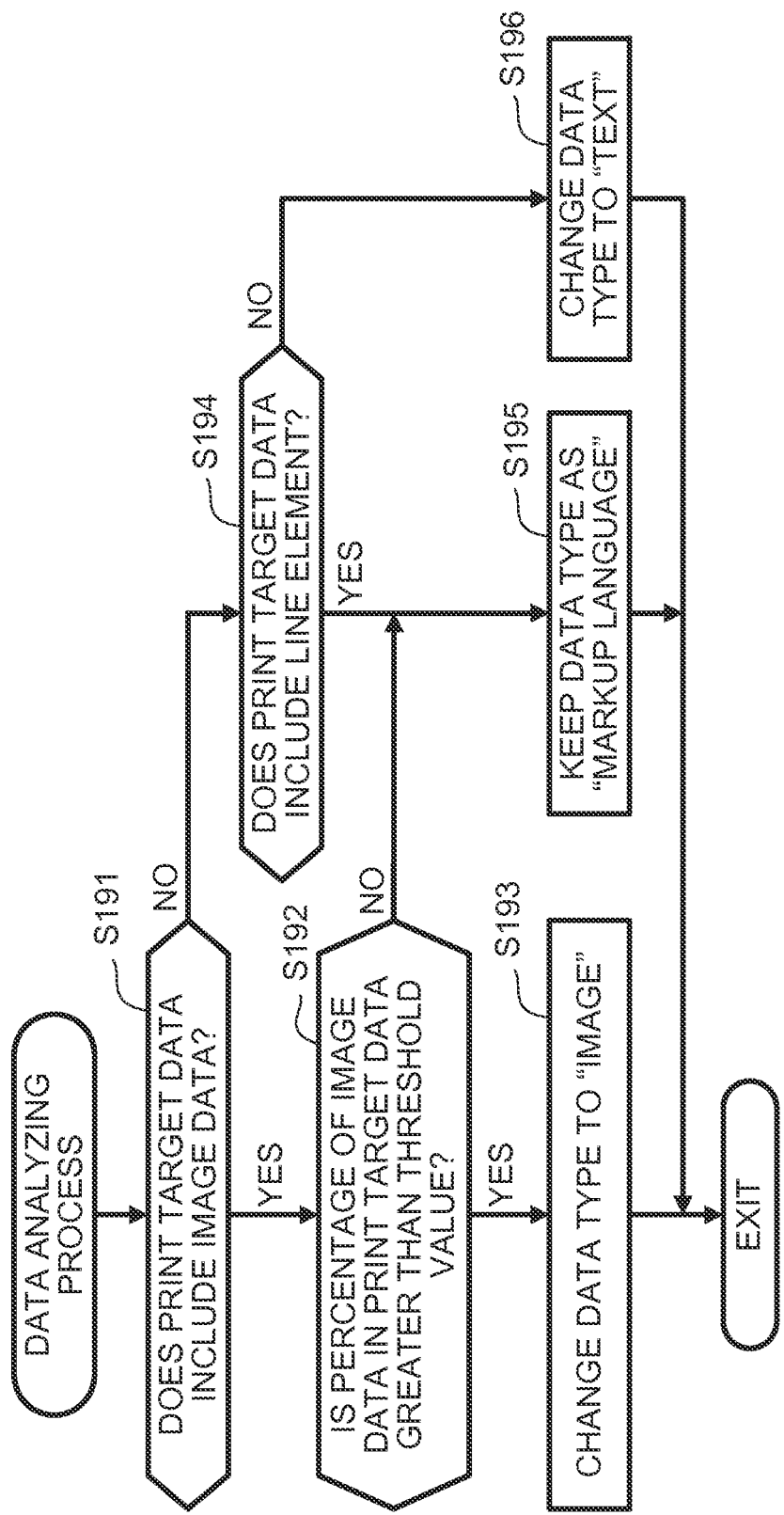
FIG. 6 is a flowchart depicting an example data analyzing process according to one or more aspects of the disclosure.

FIG. 6 is a flowchart depicting an example data analyzing process of step S143. In the data analyzing process of FIG. 6, first, CPU 51 may determine whether the print target data written in markup language includes an image (step S191). When the print target data identified as "markup language" includes an image (step S191:YES), CPU 51 may determine whether a percentage of image data in the print target data is greater than a threshold value (step S192). For example, CPU 51 may determine whether a percentage of image data of the total print target data is greater than a threshold value of 75%.

When the percentage of the image data in the print target data is greater than the threshold value (step S192:YES), CPU 51 may change the data type identification result of step S103. That is, depending on the results of the comparison with the threshold value, the CPU 51 may change the data type of the print target data from "markup language" to "image" (step S193). This change may be made because it may be desirable to perform printing of the print target image in accordance with print settings suited for printing images so that, for example, priority may be given to image quality over printing speed.

When the percentage of the image data in the print target data is less than or equal to the threshold value (step S192: NO), CPU 51 may not change the type identification result of step S103, that is, CPU 51 may keep the data type of the print target data as "markup language" (step S195) because it may be desirable to perform printing of the print target image in accordance with print settings suited for printing information written in markup language. That is, it may be desirable to place importance on the entire information written in the markup language, and not only on the image data included in the print target data.

When the print target data does not include an image (step S191:NO), CPU 51 may determine whether the print target data includes a line element (step S194). The line element may be, for example, a table or a break line. When the print target data does not include a line element (step S194:NO), CPU 51 may change the type identification result of step S103. For example, CPU 51 may change the data type of the print target data from "markup language" to "text" to give a higher priority to productivity (step S196) in recognition of the circumstance in which the print target data consists of text only and/or that the user does not require or desire printing with higher quality.

When the print target data includes a line element (step S194:YES), CPU 51 might not change the type identification result of step S103. That is, CPU 51 may keep the data type of the print target data as "markup language" (step S195) in recognition of the circumstance in which the user places importance on the entire information, including the line element, written in the markup language. After step S193, step S195, or step S196, CPU 51 may exit the data analyzing process of step S143.

Returning to FIG. 5, after step S143, CPU 51 may determine whether the data type of the print target data is "text" (step S144). When the data type of the print target data is "text," that is, when the data type of the print target data has been changed to "text" although the original data type was "markup language" (step S144:YES), CPU 51 may format the print target data to narrow a print target area to a text part (step S171). That is, the print target data written in the markup language may include tags (an example of a command code) written with commands or attribute information. However, the user might not desire or require printing of the information written in the tags. Thus, in step S171, CPU 51 may generate data in which the tags are eliminated.

After step S171, CPU 51 may inquire of the user whether the data type change is acceptable (step S172) by displaying, e.g., on touch-screen display 55, a message indicating that the data type of the print target data has been changed to "text" and/or a print image of the print target data after formatting. When CPU 51 detects an input indicating a user's acceptance (step S172:YES), the routine may proceed to step S147. When CPU 51 detects an input indicating a user's rejection (step S172:NO), the routine may proceed to step S146 to print the print target data as "markup language."

Returning to step S144, when the data type of the print target data is not "text" (step S144:NO), CPU 51 may determine whether the data type is an "image" (step S145). When the data type of the print target data is an "image," that is, when the data type of the print target data has been changed to "image" although the original data type was "markup language" (step S145:YES), CPU 51 may perform a rendering process on the print target data (step S181). Step S181 may be similar to step S151.

After step S181, CPU 51 may inquire of the user whether the data type change is acceptable (step S182) by displaying, on touch-screen display 55, a message indicating that the data type of the print target data has been changed to "image" and/or a print image of the print target data after formatting. When CPU 51 detects an input indicating a user's acceptance (step S182:YES), the routine may proceed to step S147. When CPU 51 detects an input indicating a user's rejection (step S182:NO), the routine may proceed to step S146 to print the print target data as "markup language."

Returning to step S145, when the data type of the print target data is not an "image," that is, when the data type of the print target data is kept as "markup language" (step S145: NO), CPU 51 may perform a rendering process on the print target data written in the markup language (step S146). For example, when the print target data is data in HTML format, CPU 51 may generate an image in accordance with information provided by the tags. Also, when CPU 51 detects an input indicating a user's rejection in step S172 or in step S182, CPU 51 may perform a rendering process on the print target data written in the markup language.

After step S146 or step S151, or when CPU 51 determines in step S142 that the data type of the print target data is "text" or when CPU 51 detects an input indicating a user's acceptance of the data type change in step S172 or in step S182, CPU 51 may display the print target data as a preview image on touch-screen display 55 (step S147). Then, the routine may wait until CPU 51 detects a user's input of a print execution instruction.

Figure 7:
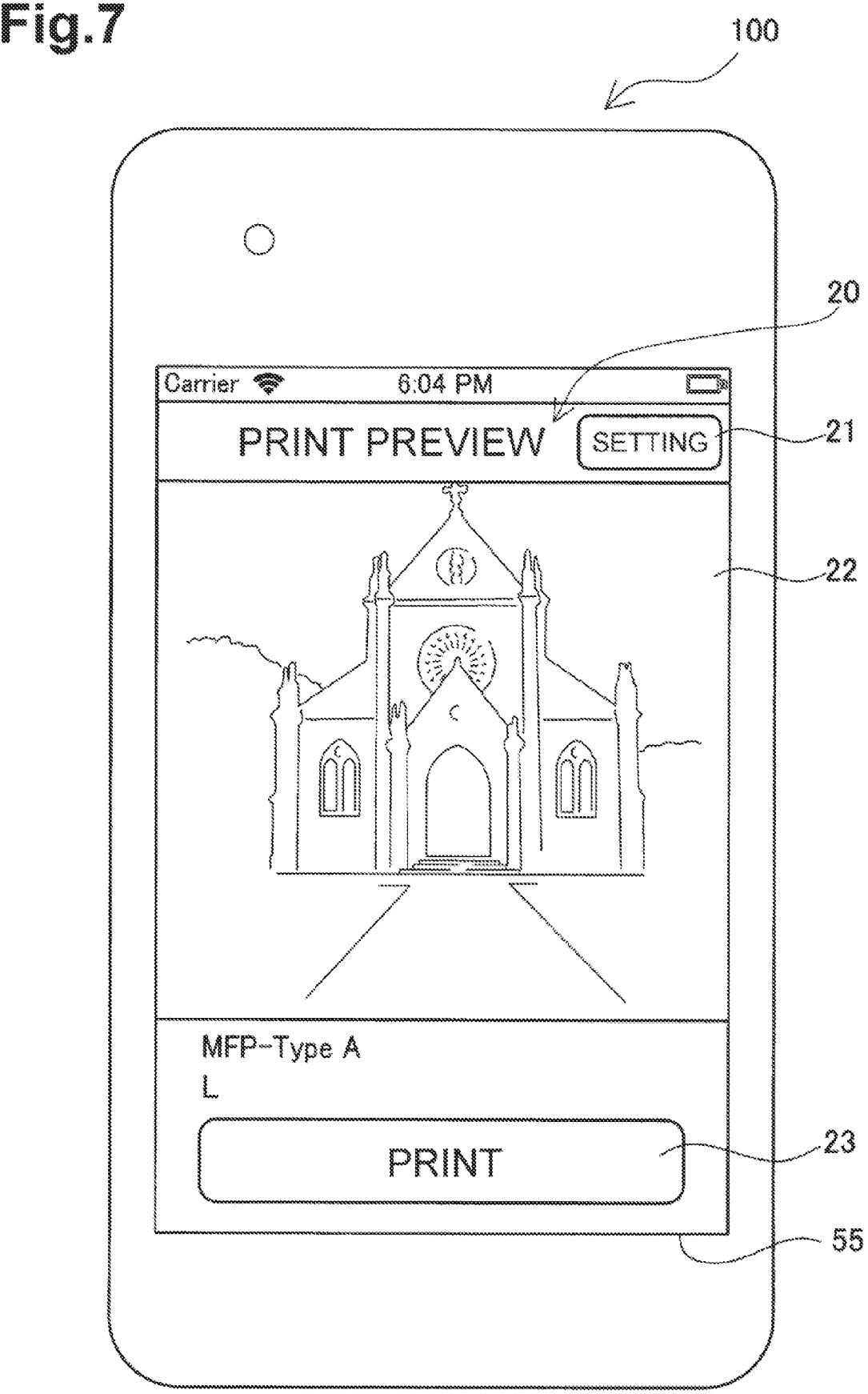
FIG. 7 depicts an example preview screen of an application when a data type is an image according to one or more aspects of the disclosure.

FIG. 7 depicts a print preview screen 20 that application 110 may display in step S147. Print preview screen 20 may comprise a virtual "SETTING" button 21 for accessing a print setting screen, a preview area 22 for displaying a preview image, and a virtual "PRINT" button 23 for inputting a print execution instruction. The print preview screen 20 allows the user to preview a print image of the print target data displayed on preview area 22 so that the user may confirm that the print image is desirable before printing.

Figure 8:
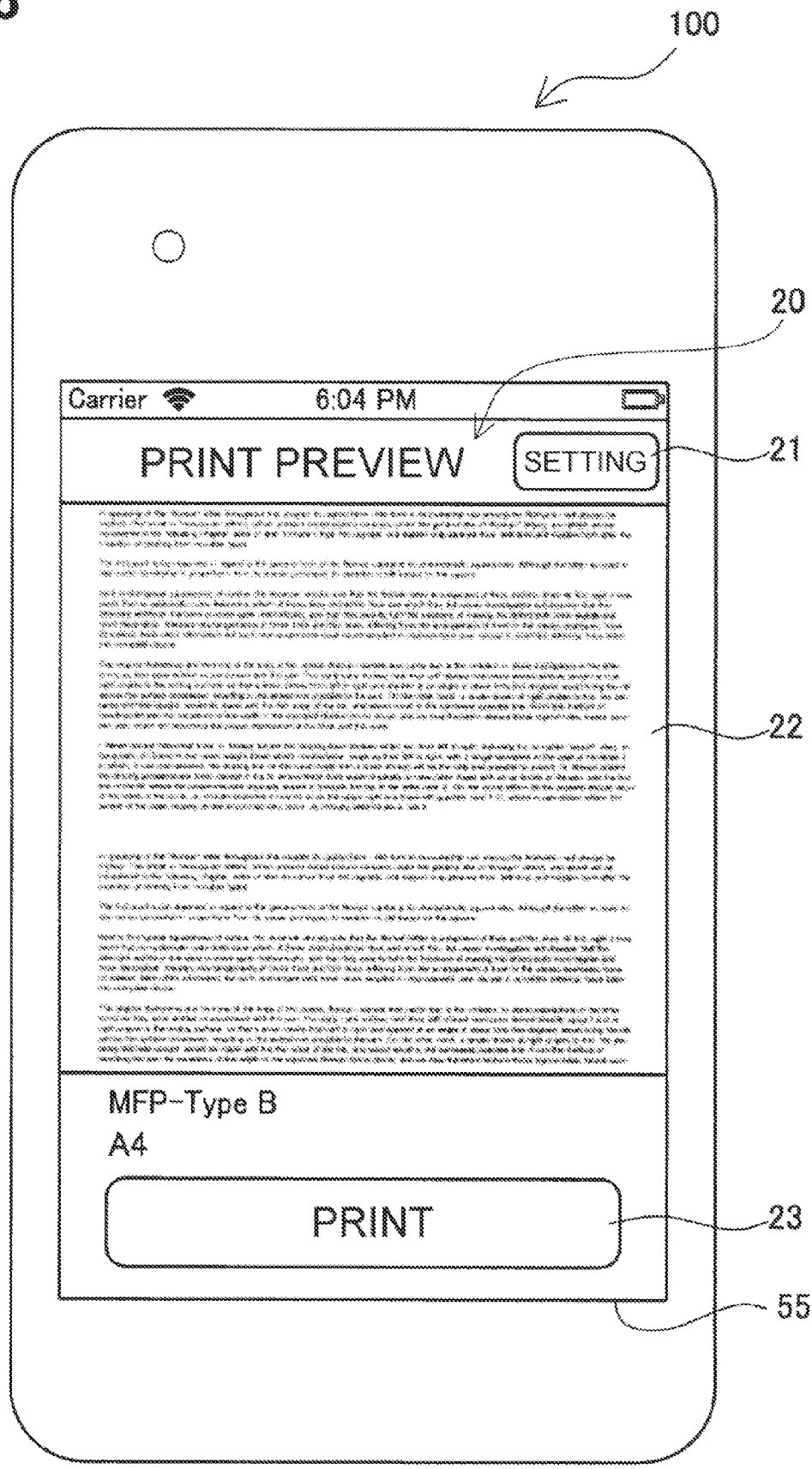
FIG. 8 depicts an example preview screen of an application when a data type is text according to one or more aspects of the disclosure.
Figure 9:
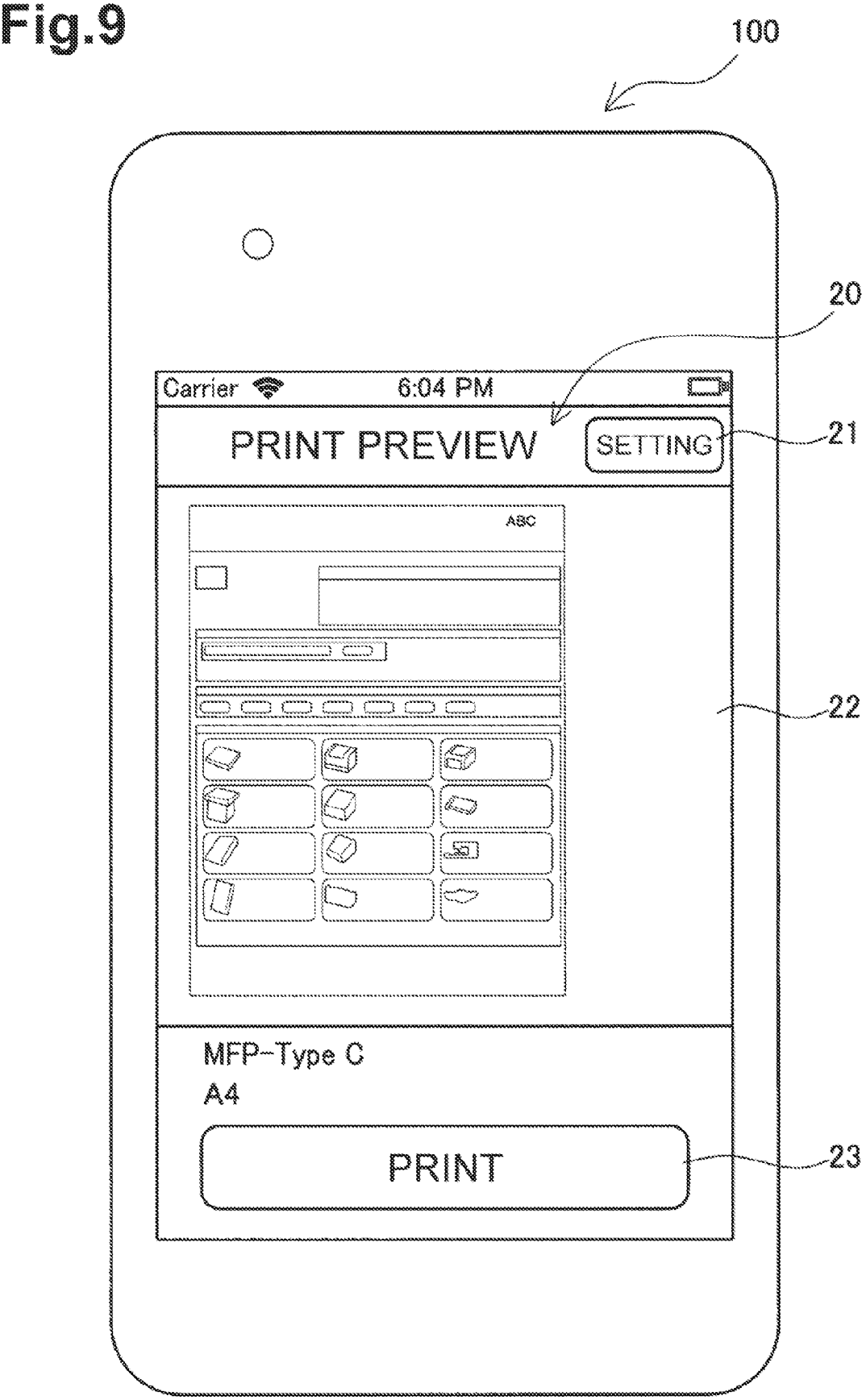
FIG. 9 depicts an example preview screen of an application when a data type is markup language according to one or more aspects of the disclosure.

FIG. 7 depicts an example print preview screen 20 when the data type of the print target data is an "image." FIG. 8 depicts an example print preview screen 20 when the data type of the print target data is "text." FIG. 9 depicts an example print preview screen 20 when the data type of the print target data is "markup language." As depicted in FIGS. 7-9, print preview screen 20 may have similar layouts regardless of the data type. Therefore, print preview screen 20 may aid user friendliness despite differences in the data types.

Figure 10:
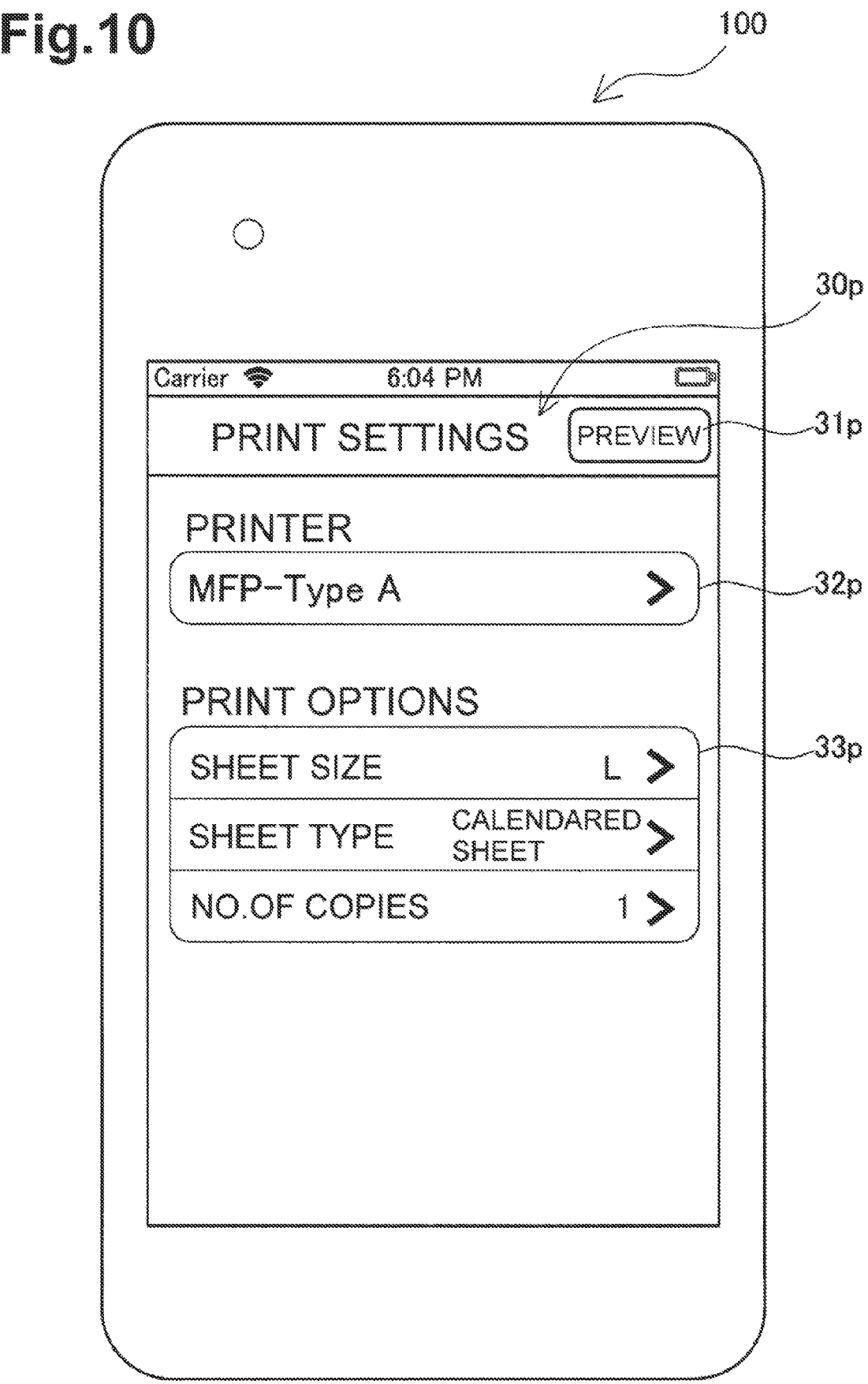
FIG. 10 depicts an example print setting screen of an application when a data type is an image according to one or more aspects of the disclosure.

The print setting screens that may appear when the virtual "SETTING" button 21 is touched may comprise different setting items depending on the data type. FIG. 10 depicts an example print setting screen 30p when the data type of the print target data is an "image." Print setting screen 30p may comprise a virtual "preview" button 31p for returning to print preview screen 20, a printer specifying area 32p for specifying a printer to be used, and an option specifying area 33p for specifying one or more print options. When a user touches printer specifying area 32p, printer specifying area 32p may list available printers and may allow the user to change a currently-selected printer to another printer to be used for printing. Similarly, when a user touches option specifying area 33p, option specifying area 33p may allow the user to change one or more printer options, such as sheet size, sheet type, number of copies, etc.

When the data type of the print target data is an "image," it may be desirable to obtain a print result of the print target data with higher quality, such as that of the level of quality desired for photo album printing. Therefore, on print setting screen 30p, for example, "postcard" (or "L" which is equivalent to 3R) may be specified as an initial value of a sheet size and "calendared sheet" may be specified as an initial value of a sheet type. In other embodiments, for example, the print options may further comprise one or more of a print-resolution setting and a print-color setting. In this embodiment, the highest print resolution that may be available in the specified printer may be automatically specified. When color printing is available in the specified printer, the color printing may be automatically specified. When the data type of the print target data is an "image," there may be lower possibility that the print target data consists of a plurality of pages. Therefore, print setting screen 30p might not display settings related to a print layout or a double-sided printing.

Figure 11:
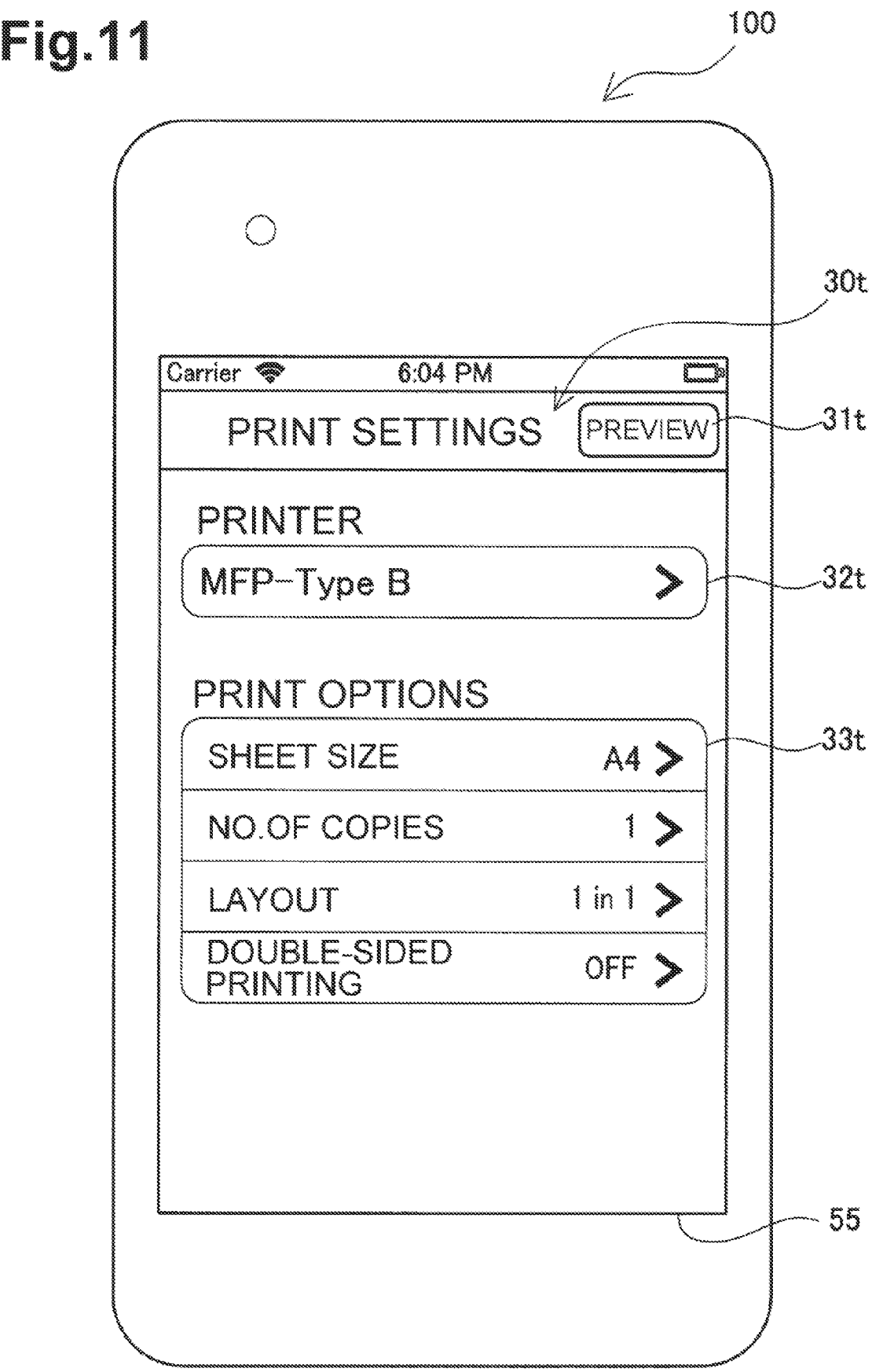
FIG. 11 depicts an example print setting screen of an application when a data type is text according to one or more aspects of the disclosure.

FIG. 11 depicts an example print setting screen 30t when the data type of the print target data is "text." Similar to print setting screen 30p depicted in FIG. 10, print setting screen 30t may comprise a virtual "preview" button 31t for returning to print preview screen 20, a printer specifying area 32t for specifying a printer to be used, and an option specifying area 33t for specifying one or more print options. That is, print setting screen 30t may have a similar layout as print setting screen 30p. However, the print options on the print setting screen 30t may comprise setting items that may be different from those included in the print options displayed on print setting screen 30p.

When the data type of the print target data is "text," there may be a lower possibility that the user desires to obtain a print result of the print target data with higher quality. It may be preferable to perform printing of the print target data with consideration given to a printing speed, and therefore, to perform, for example, monochrome printing or lower-resolution printing. Also, "A4" may be specified as an initial value of the sheet size. Further, a fixed value that may be "plain paper" may be specified for the sheet type, and therefore, the sheet type might not be displayed on option specifying area 33t. When the data type of the print target data is "text," it may be more likely that the print target data may consist of a plurality of pages, and therefore, one or more of N-up printing and double-sided printing options may be made available. Thus, the print options may comprise a print layout setting and a double-sided printing setting in the option specifying area 33t on print setting screen 30t. In other embodiments, for example, the print options may further comprise one or more of a print-resolution setting and a print-color setting. In some embodiments, the highest print resolution that may be available in the specified printer may be automatically specified. Also, monochrome printing may be automatically specified even when color printing is available in the specified printer.

Figure 12:
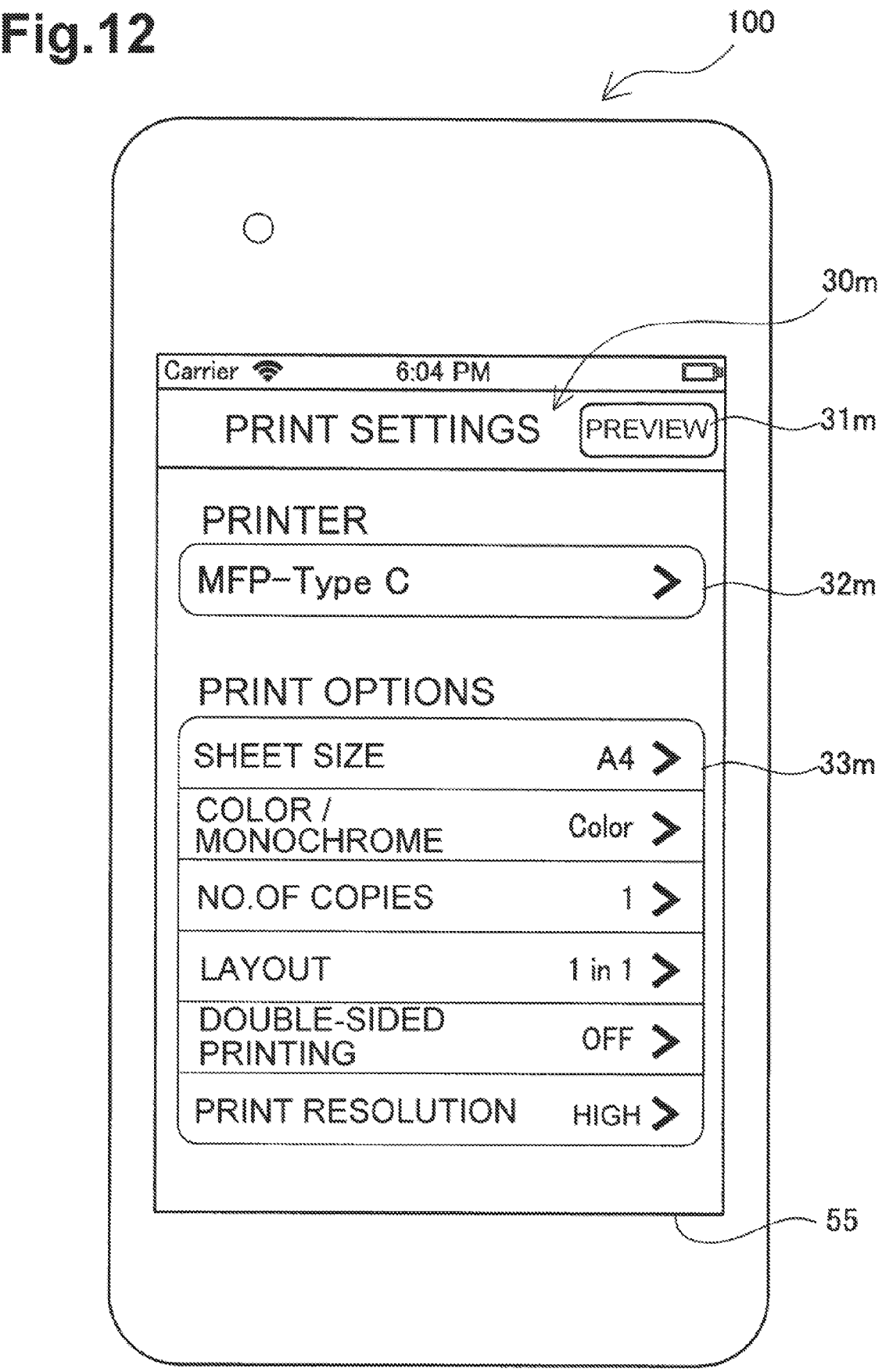
FIG. 12 depicts an example print setting screen of an application when a data type is markup language according to one or more aspects of the disclosure.

FIG. 12 depicts an example print setting screen 30m when the data type of the print target data is "markup language." Similar to print setting screen 30p depicted in FIG. 10 and print setting screen 30t depicted in FIG. 11, print setting screen 30m may comprise a virtual "preview" button 31m for returning to print preview screen 20, a printer specifying area 32m for specifying a printer to be used, and an option specifying area 33m for specifying one or more print options. That is, print setting screen 30m may have a similar layout as print setting screen 30p and print setting screen 30t. However, the print options may comprise setting items that may be different from those included in the print options displayed on print setting screen 30p or print setting screen 30t.

When the data type of the print target data is "markup language," the print target data may consist of an image and/or text. Therefore, print setting screen 30m may comprise a print-resolution setting and a print-color setting as print options in addition to the setting items of the print options for the print target data identified as "text." Thus, application 110 may satisfy the user who may desire to place importance on the image quality and also the user who may desire to place importance on the productivity.

The user may perform a print setting process by controlling a print setting screen 30p, 30t, 30m (hereinafter, collectively referred to as "print setting screen 30") provided for every data type. Print setting screen 30 may comprise different setting items and different initial values for the setting items based on the data type. That is, the print setting screens 30 may be customized and displayed in accordance with the characteristics of the print target data. Further, the print setting screens 30 may allow users to confirm the details of the print settings.

The user may touch virtual "PRINT" button 23 on print preview screen 20 to input a print execution instruction. CPU 51 may generate print data to which the settings specified on print setting screen 30 may be applied in application 110 (step S148) on condition that CPU 51 detects touching of the virtual "PRINT" button 23 on print preview screen 20. After step S148, CPU 51 may exit print data generating process of step S105.

Returning to FIG. 4, after step S105, CPU 51 may send the generated print data to the specified printer (printer 200 in this embodiment) (step S106). Upon receipt of the print data, printer 200 may start printing of the print data. Then, when printing is successfully completed, CPU 51 may receive a completion notice notifying mobile device 100 of successful completion. Additionally, or alternatively, CPU 51 may receive a completion notice notifying mobile device 100 of an occurrence of an error indicating that printing failed.

After step S106, CPU 51 may determine whether a completion notice has been received from printer 200 (step S107). When CPU 51 has not received a completion notice from printer 200 (step S107:NO), the routine may wait until the completion notice is received.

When a completion notice has been received from printer 200 (step S107:YES), CPU 51 may determine whether the completion notice indicates successful completion (step S108). When the completion notice indicates successful completion (step S108:YES), CPU 51 may determine whether the setting for erasing the print target data from clipboard 120 after completion of printing is activated in the detailed settings (step S109).

When the setting for erasing the print target data from clipboard 120 after completion of printing is activated (step S109:YES), CPU 51 may erase the print target data from clipboard 120 (step S110). In recognition that the need for retaining the print target data in clipboard 120 may decrease after the printing was completed, the print target data may be erased from clipboard 120 after printing. This configuration may prevent or reduce an occurrence of undesired duplicate printing of the print target data that has already been printed. The erasing of the print target data may also reduce a risk of the print target data being stolen by a malicious third party. Accordingly, the erasing of the print target data may improve print target data security.

After step S110, CPU 51 may exit the clipboard data printing process. When the setting for erasing the print target data from clipboard 120 after completion of printing is not activated (step S109:NO) or when the completion notice does not indicate successful completion (step S108:NO), CPU 51 may exit the clipboard data printing process without erasing the data from clipboard 120.

When there is no data stored in clipboard 120 (step S101:NO) or when the data type of the print target data is "unknown" (step S104:YES), CPU 51 may provide notification to the user that there is no data stored in clipboard 120 that may be printed (step S121). The notification may be provided by, for example, displaying a message on touch-screen display 55 or playing sounds, for example, a beep or voice messages.

After step S121, CPU 51 may determine whether the setting for displaying the operation procedure screen is activated in the detailed settings (step S122). When the setting for displaying the operation procedure screen is activated (step S122:YES), CPU 51 may display the operation procedure screen on touch-screen display 55 (step S123). The operation procedure screen may display a procedure for displaying data using another application program (for example, a browser), specifying a part desired to be printed, and inputting a copy instruction. By doing so, the user may learn how to use clipboard 120. The procedure may be outputted by voice in addition to, or instead of, displaying a message on touch-screen display 55. After step S123 or when the setting for displaying the operation procedure screen is not activated (step S122:NO), CPU 51 may exit the clipboard data printing process.

In this embodiment, before performing the clipboard data printing process, CPU 51 may determine whether the print target data needs to be erased after printing (step S109) or whether the operation procedure screen needs to be displayed (step S122) based on the predetermined detailed settings. In other embodiments, CPU 51 may prompt the user for these settings every time CPU 51 performs step S109 or step S122, respectively.

Figure 13:
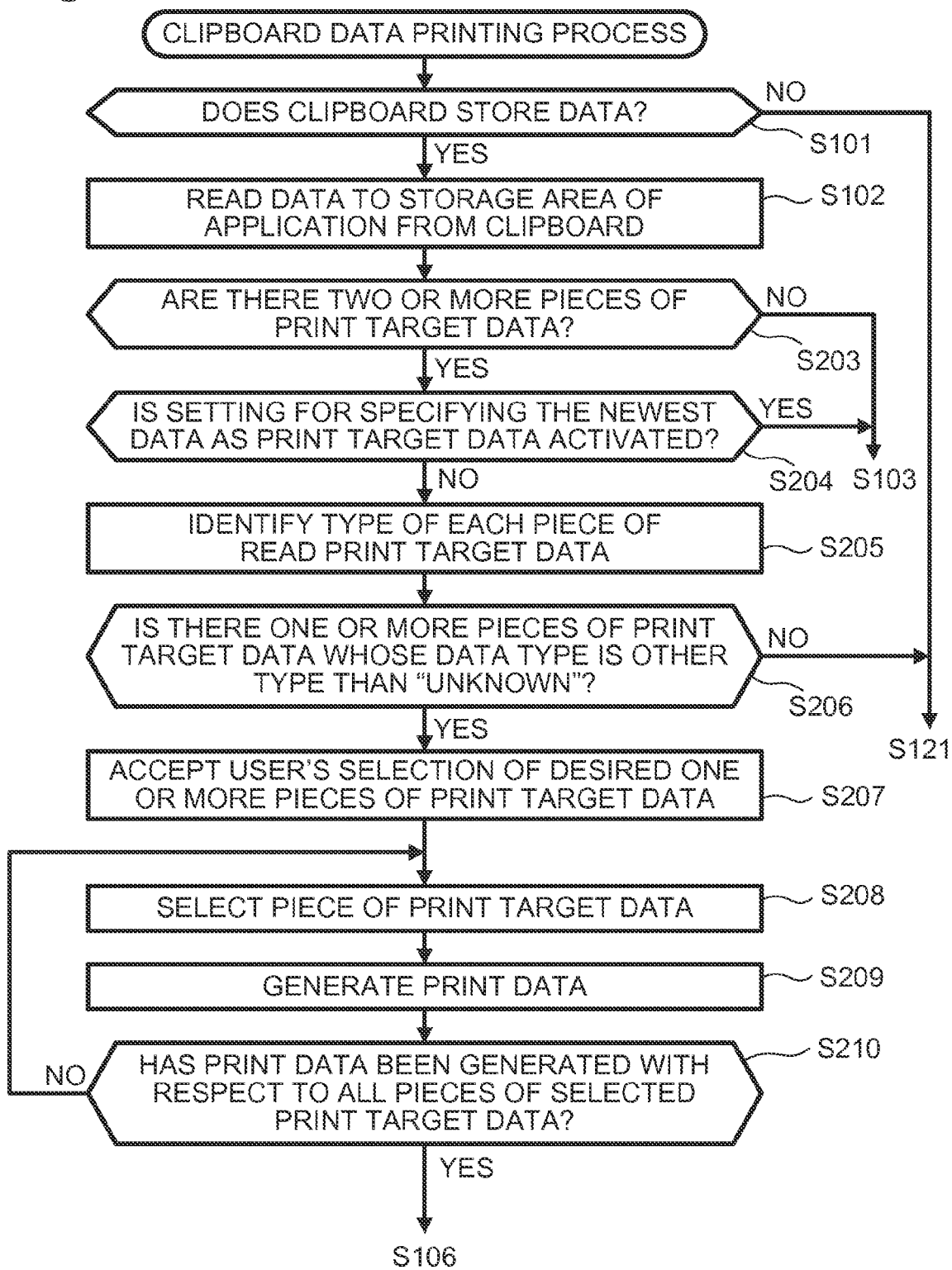
FIG. 13 is a flowchart depicting another example clipboard data printing process of an application according to one or more aspects of the disclosure.

A clipboard data printing process according to one or more aspects of another embodiment is described below with reference to FIG. 13. The clipboard data printing process may utilize the clipboard 120, which may be configured to store one or more pieces of data.

When there are a plurality of pieces of data in clipboard 120, the detailed settings that may be specified via virtual "SETTINGS" button 11 of main menu screen 10 may comprise a setting for specifying whether all of the plurality of pieces of data may be included in print target data or whether the newest data of the plurality of pieces of data may be specified as print target data. This setting may be utilized in the clipboard data printing process.

In the clipboard data printing process, when clipboard 120 stores one or more pieces of data (step S101:YES), CPU 51 may read all of the one or more pieces of data from clipboard 120 and write them to the storage area of application 110 (step S102).

Then, CPU 51 may determine whether there are two or more pieces of print target data read in step S102 (step S203). When there is a single piece of print target data (step S203: NO), CPU 51 may perform step S103 and subsequent steps of FIG. 4. When there are two or more pieces of print target data (step S203:YES), CPU 51 may determine whether a setting for specifying the newest data as print target data is activated (step S204). When the setting for specifying the newest data as print target data is activated (step S204:YES), CPU 51 may perform step S103 and subsequent steps of FIG. 4 with respect to the newest data.

When all of the plurality of pieces of data read in step S102 are specified as candidates for print target data (step S204: NO), CPU 51 may identify a type of each piece of the read print target data (step S205). CPU 51 may perform a similar type-identification process as step S103 of FIG. 4.

Then, CPU 51 may determine whether there is one or more pieces of print target data whose data type is other type than "unknown" (step S206). When the data type of all pieces of print target data are identified as "unknown" (step S206:NO), CPU 51 may perform step S121 and subsequent steps of FIG. 4 because CPU may determine that there is no print target data to be printed.

When there is one or more pieces of print target data whose data type is a type other than "unknown," that is, when there is at least one piece of print target data whose data type was identified as "image," "text," or "markup language" (step S206:YES), CPU 51 may accept a user's selection of a desired one or more pieces of print target data by displaying a print data selecting screen 40 for allowing the user to perform the selection on touch-screen display 55 (step S207).

Figure 14:
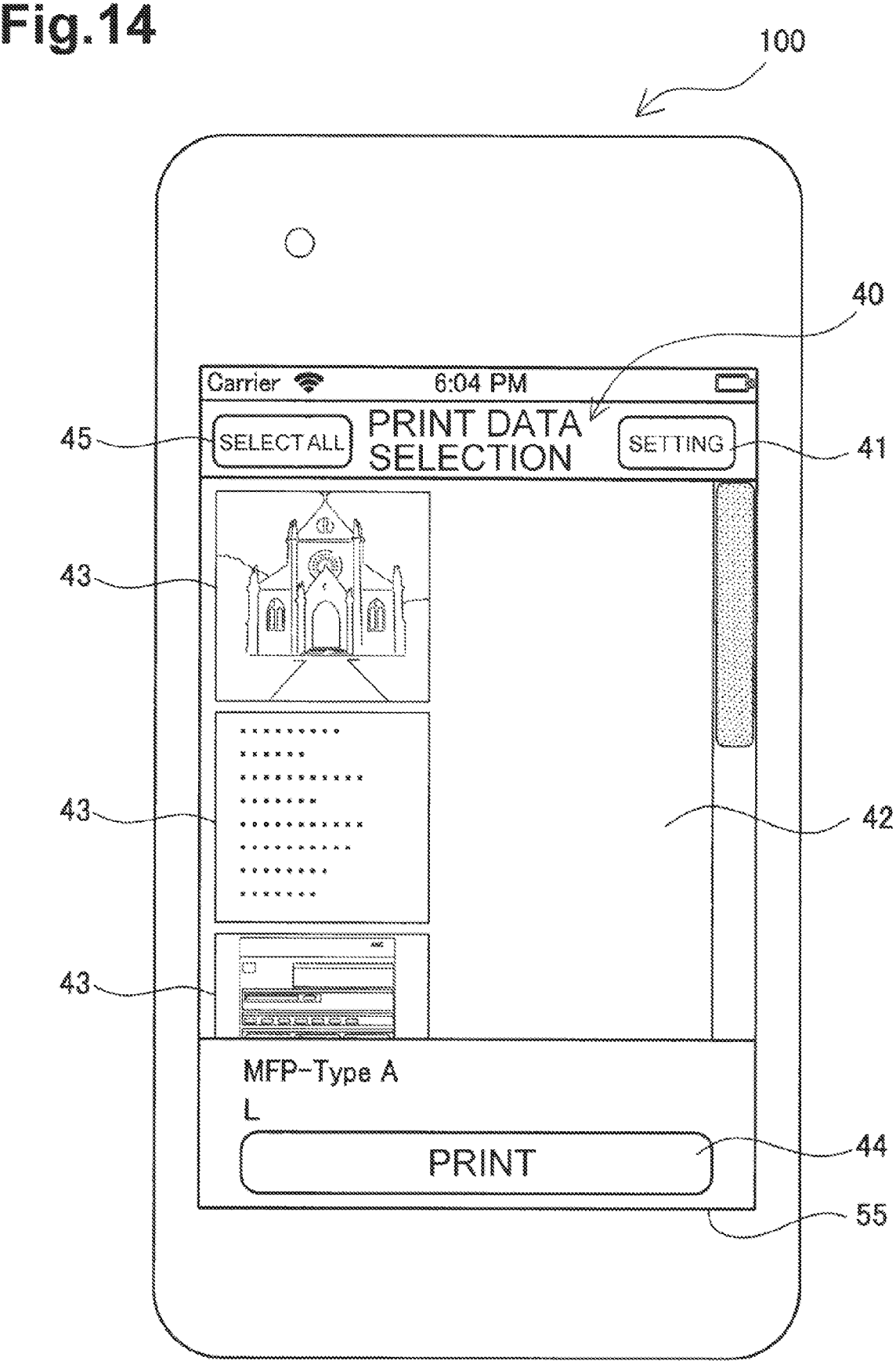
FIG. 14 depicts an example print data selecting screen of an application when a plurality of pieces of data are stored in the clipboard according to one or more aspects of the disclosure.

FIG. 14 depicts an example print data selecting screen 40 that application 110 may display in step S207. Print data selecting screen 40 may comprise a virtual "SETTING" button 41, a thumbnail display area 42, a virtual "PRINT" button 44, and a virtual "SELECT ALL" button 45. Virtual "SETTING" button 41 may be used to access a suitable print setting screen. Thumbnail display area 42 may be used to display one or more thumbnails 43 of the one or more pieces of print target data whose data type was identified. Virtual "PRINT" button 44 may be used to input a print execution instruction. Virtual "SELECT ALL" button 45 may be used to select all pieces of the print target data displayed in thumbnail display area 42. The user may generally assess the contents of each piece of the print target data by looking at the one or more thumbnails 43 displayed in thumbnail display area 42. When the data type of the print target data is "text," a corresponding thumbnail 43 may be displayed with information, for example, "No Image," indicating that the print target data is not an "image" data type.

On print data selecting screen 40, a desired one or more pieces of print target data may be selected when a user touches one or more thumbnails 43. When touching of virtual "PRINT" button 44 is detected while one or more thumbnails 43 representing the desired one or more pieces of print target data are selected, a print instruction is inputted to print the selected one or more pieces of print target data. When touching of virtual "SETTING" button 41 is detected while one or more thumbnails 43 representing the desired one or more pieces of the print target data are selected, a print setting screen appropriate for the data type of the selected one or more pieces of print target data may appear. That is, when the data type is "image," print setting screen 30p may appear. When the data type is "text," print setting screen 30t may appear. When the data type is "markup language," print setting screen 30m may appear. With this configuration, the print setting may be performed in accordance with the data type of the print target data.

In other embodiments, for example, print preview screen 20 may appear when a user touches a thumbnail 43 to display print target data corresponding to the touched thumbnail 43 thereby allowing the user to preview the image to be printed. Further, via the print preview screen 20, a print execution instruction may be received.

When touching of virtual "SELECT ALL" button 45 is detected, all thumbnails 43 displayed in thumbnail display area 42 may be selected on print data selecting screen 40. Selection of the thumbnails 43 may be indicated by highlighting, shading, bolding, or otherwise altering the thumbnails 43. When touching of virtual "PRINT" button 44 is detected while all thumbnails 43 are selected, a print execution instruction may be received to print the plurality of pieces of the print target data corresponding to all of the selected thumbnails 43.

When touching of virtual "PRINT" button 44 is detected while a plurality of thumbnails 43 are selected, a screen for allowing the user to select a data type may appear and then a print setting screen corresponding to the selected data type may appear.

In other embodiments, while a plurality of thumbnails 43 are selected a print setting screen corresponding to the largest number of the data types identified with respect to selected thumbnails 43 may appear. In another example, when a plurality of pieces of print target data of selected thumbnails 43 have various data types, a print setting screen for specifying all setting items may appear.

In the above-described embodiment, after step S207, CPU 51 may select a piece of print target data from the one or more pieces of print target data that were selected in step S207 but have not yet been used to generate print data (step S208). Then, CPU 51 may generate print data with respect to the selected print target data in accordance with the print setting of the data type (step S209).

After that, CPU 51 may determine whether print data has been generated with respect to all pieces of print target data selected in step S207 (step S210). When there is one or more pieces of print target data that have not been used to generate print data (step S210:NO), the routine may proceed to step S208. In step S208, CPU 51 may select a piece of print target data that has not been used to generate print data and generate print data with respect to the selected print target data.

Figure 4:
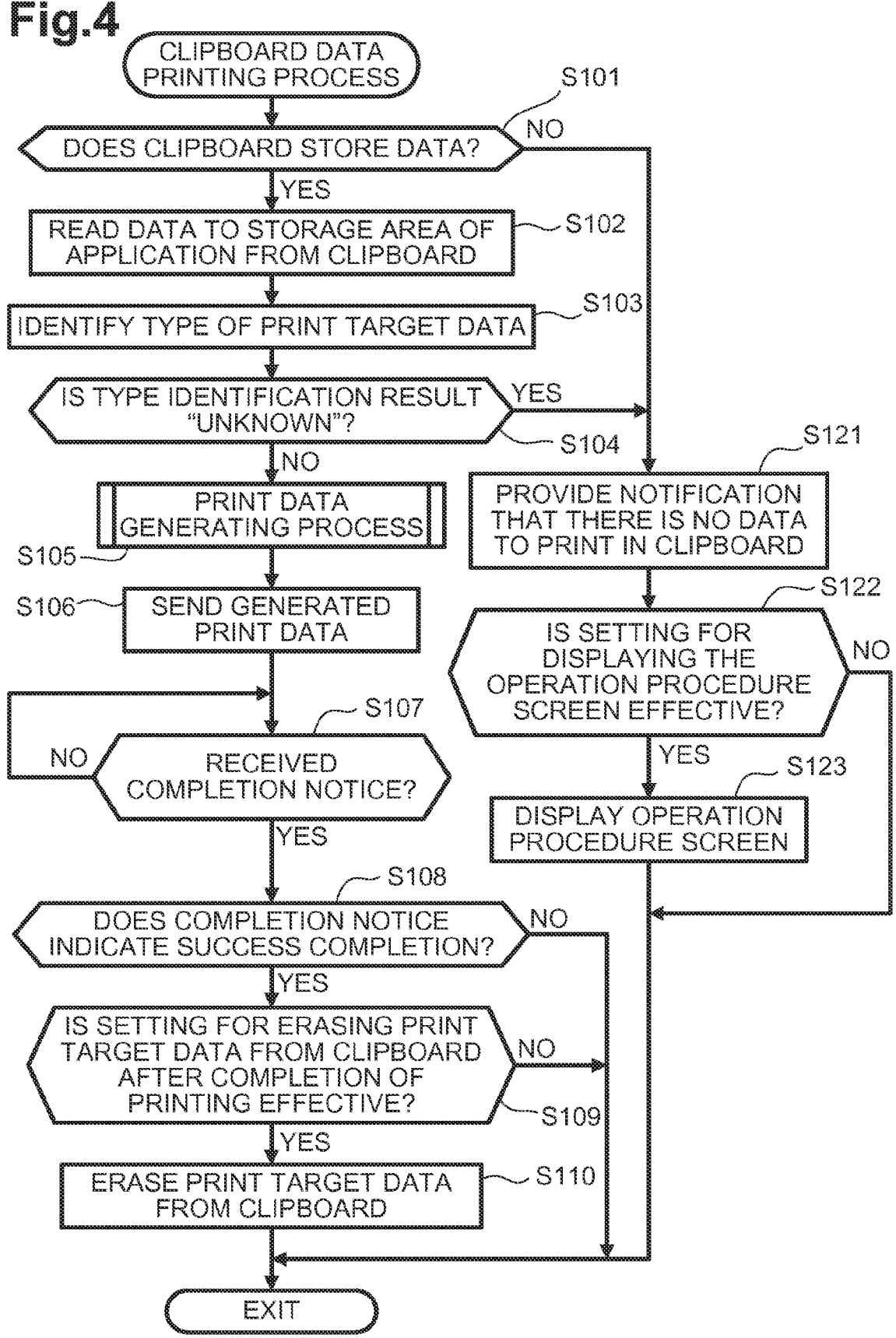
FIG. 4 is a flowchart depicting an example clipboard data printing process of the application according to one or more aspects of the disclosure.

When print data has been generated with respect to all pieces of the print target data (step S210:YES), CPU 51 may perform the same steps as step S106 and subsequent steps of FIG. 4. That is, CPU 51 may send all pieces of the generated print data to printer 200.

As described above, mobile device 100 according to the above-described embodiments may not require the user to paste the desired data into application 110 because application 110 reads one or more pieces of print target data from clipboard 120 to generate print data with respect to the one or more pieces of print target data for printing one or more pieces of data stored in clipboard 120. Therefore, mobile device 100 may save the user time and/or improve user friendliness. In mobile device 100 according to the above-described embodiments, the print setting may be specified in accordance with the data type of the print target data. For example, when the data type of the print target data is an "image," higher-quality and higher-resolution color printing may be specified because image quality may be more important than productivity. When the data type of the print target data is "text," lower-resolution monochrome printing may be specified because productivity may be more important than image quality. Accordingly, printing may be customized based on the characteristics of the print target data.

While the disclosure has included various example structures and illustrative embodiments, it will be understood by those skilled in the art that other variations and modifications of the structures and embodiments described above may be made without departing from the scope of the disclosure. Other structures and embodiments will be apparent to those skilled in the art in view of the specification or practice of the embodiments disclosed herein. It is intended that the specification and the described examples are illustrative. For example, the print control device may be a personal computer ("PC") or workstation as well as mobile device 100 as long as the print control device is configured to control a printing apparatus. The printing apparatus may be a copy machine or multifunction peripheral device as well as printer 200 as long as the printing apparatus is configured to perform a printing function.

Further, in view of this disclosure it should be understood that one or more steps in the above-described processes may be added, omitted, and/or modified. For example, according to the above-described embodiments, application 110 may display print preview screen 20 to accept a print execution instruction or the print setting after identifying the data type of the print target data. However, in other embodiments, after identifying the data type, application 110 may generate print data in accordance with the print setting corresponding to the identified data type without displaying print preview screen 20. In this case, the print setting may adopt the initial values displayed on print setting screen 30 for the respective data type. This configuration may save the user from having to confirm the print settings. The print settings may adopt appropriate values by data type. Therefore, application 110 may provide print data that may satisfy the image quality required by the user.

The processes disclosed in the above-described embodiments may be performed by a single CPU, a plurality of CPUs, hardware, for example, a special application specific integrated circuit ("ASIC"), or a combination of a CPU and an ASIC. For example, the control device 50 may include an ASIC that may perform each of the steps that the CPU 51 may perform as described herein. Also, the processes and methods disclosed in the above-described embodiments may be implemented by various manners, for example, by executing one or more programs stored on computer-readable storage media.

In the above-described embodiments, CPU 51 may generate the print data in accordance with the print settings for the data type of the print target data obtained from clipboard 120. When no print target data is obtained from clipboard 120, CPU 51 may notify the user of the absence of the print target data in clipboard 120. In other embodiments, CPU 51 might not be configured to identify the data type of print target data. For example, when one or more pieces of print target data are obtained from clipboard 120, CPU 51 may generate print data in accordance with a predetermined print setting. In some of these other embodiments, when no print target data is obtained from clipboard 120, CPU 51 may also notify the user of the absence of the print target data in clipboard 120, so that the user may confirm that there is no print target data that may be obtained from clipboard 120 and confusion may be reduced.

In the above-described embodiments, CPU 51 may generate the print data in accordance with the print settings for the data type of the print target data obtained from clipboard 120. After sending the print data, CPU 51 may erase the data from clipboard 120 as needed. However, in other embodiments, CPU 51 might not be configured to identify the data type of print target data. For example, when one or more pieces of print target data are obtained from clipboard 120, CPU 51 may generate print data in accordance with a predetermined print setting. In some of these other embodiments, after sending the print data, CPU 51 may also erase the data from clipboard 120 as needed, and therefore, may prevent or reduce an occurrence of undesired duplicate printing of data that has been used for printing.

In the above-described embodiment, CPU 51 may identify the data type of each of the plurality of pieces of print target data obtained from clipboard 120 and generate print data at a time in accordance with an appropriate print setting. However, in other embodiments, CPU 51 might not be configured to identify the data type of the print target data. For example, CPU 51 may generate print data at a time in accordance with a predetermined print setting for all of the plurality of pieces of print target data obtained from clipboard 120. This type of batch print instruction may increase user convenience.

What is claimed is:

1. A print control device, comprising:
    a control device configured to:
        determine whether there is data stored in a clipboard;
        in response to a determination that there is no data stored in the clipboard, provide a notification that there is no data to be printed and a first instruction describing how to store data in the clipboard;
        in response to a determination that there is data stored in the clipboard, obtain print target data stored in the clipboard;
        identify a data type of the print target data obtained from the clipboard;
        determine whether the print target data is to be printed based on the identified data type of the print target data;
        in response to determining that the print target data is to be printed, generate print data based on the print target data in accordance with a print setting appropriate for the identified data type of the print target data and send the generated print data to a printing apparatus; and
        in response to determining that the print target data is not to be printed, provide the notification that there is no data to be printed and a second instruction describing how to store data in the clipboard.

2. The print control device according to claim 1, wherein the clipboard comprises a storage area used by a plurality of applications, and wherein the data type is one of an image data type, text data type, and markup language data type.

3. The print control device according to claim 2, wherein when the data type of the print target data is the image data type, the control device is configured to generate the print data with at least one of a higher resolution, higher definition, or more colors than print data generated when the data type is the text data type or markup language data type.

4. The print control device according to claim 2, wherein the control device is configured to generate the print data in accordance with a command code of the print target data, when the data type of the print target data is the markup language data type.

5. The print control device according to claim 2, wherein the control device is configured to change the data type of the print target data to the image data type, when the data type of the print target data is initially identified as the markup language data type, but a percentage of image data in the print target data is greater than a threshold value.

6. The print control device according to claim 2, wherein the control device is configured to change the data type of the print target data to the text data type, when the data type of the print target data is initially identified as the markup language data type, but the print target data lacks an image or a line element.

7. The print control device according to claim 6, wherein the control device is configured to format the print target data to narrow a print target area, when the control device determines that the data type of the print target data changed from the markup language data type to the text data type.

8. The print control device according to claim 1,
wherein the control device is configured to:
generate an inquiry to determine whether printing based on a changed data type is acceptable, after the data type of the print target data changes from a markup language data type to an image data type or a text data type;
generate the print data in accordance with the print setting appropriate for the changed data type when detecting an input indicating an acceptance of the printing; and
generate the print data in accordance with the print setting for the markup language data type when detecting an input indicating a rejection of the printing.

9. The print control device according to claim 1, wherein the control device is configured to identify the data type of the print target data as a markup language data type when the print target data is a file in web archive format or in text/html format.

10. The print control device according to claim 1, wherein the control device is configured to provide a procedure for storing data into the clipboard.

11. The print control device according to claim 1, wherein the control device is further configured to select, based on a user input, one or more pieces of print target data from a plurality of pieces of print target data obtained from the clipboard.

12. The print control device according to claim 1, wherein the control device is further configured to accept a single batch print instruction for printing all of a plurality of pieces of print target data obtained from the clipboard.

13. The print control device according to claim 11, further comprising:
a display portion configured to list the plurality of pieces of print target data obtained from the clipboard.

14. The print control device according to claim 1, wherein the control device is further configured to erase, from the clipboard, data corresponding to the print target data that was used to generate the print data, after sending the print data.

15. The print control device according to claim 1, wherein the control device is further configured to output a setting screen for setting the print setting appropriate for the identified data type.

16. A non-transitory, computer-readable storage medium storing a computer program that, when executed by a control device, causes the control device to:
identify a data type of print target data obtained from a clipboard;
generate print data based on the print target data in accordance with a print setting appropriate for the identified data type;
send the generated print data to a printing apparatus; and
provide a notification that there is no data to be printed and an instruction describing how to store data in the clipboard, in a first case when there is no data stored in the clipboard and in a second case when all data stored in the clipboard is not to be printed.

17. The non-transitory, computer-readable storage medium of claim 16,
wherein the data type is one of an image data type, text data type, and markup language data type, and
wherein when the data type of the print target data is the image data type, the control device is configured to generate the print data with at least one of a higher resolution, higher definition, or more colors than print data generated when the data type is the text data type or markup language data type.

18. A print control device, comprising:
a control device configured to:
identify a data type of print target data obtained from a clipboard;
generate print data based on the print target data in accordance with a print setting appropriate for the identified data type; and
send the generated print data to a printing apparatus,
wherein the data type is one of an image data type, text data type, and markup language data type, and
wherein in response to an identification that the data type of the print target data is the image data type, the control device is configured to generate the print data with at least one of a higher resolution, higher definition, or more colors than in a case where the data type is identified as the text data type or markup language data type.

19. The print control device of claim 18,
wherein the clipboard comprises a storage area used by a plurality of applications, and
wherein the control device is configured to output a print preview screen in accordance with the print setting appropriate for the identified data type.

20. The print control device of claim 19, wherein the control device is configured to output a setting screen in accordance with the print setting appropriate for the identified data type, wherein the setting screen is configured to receive a user input to change the print setting prior to generating the print data in accordance with the print setting.

21. The print control device of claim 1, wherein the control device is configured to output a print preview screen in accordance with the print setting appropriate for the identified data type.

22. The print control device of claim 21, wherein the control device is configured to output a setting screen in accordance with the print setting appropriate for the identified data type, wherein the setting screen is configured to receive a user input to change the print setting prior to generating the print data in accordance with the print setting.

23. The print control device according to claim 1,
wherein the control device is further configured to output, to a display, a screen for providing the notification and at least one of the first instruction or the second instruction, and wherein the first instruction and the second instruction are the same.

24. The print control device according to claim 1,
wherein the control device is further configured to output, to a display, a screen for providing the notification and at least one of the first instruction or the second instruction, and wherein at least one of the first instruction or the second instruction describe a procedure for specifying an area to be printed.

* * * * *